May 25, 1965 P. R. ZENTNER 3,185,518
AUTOMOTIVE CAMPING DEVICE FOR USE WITH STATION WAGONS
Filed Dec. 3, 1962 6 Sheets-Sheet 1
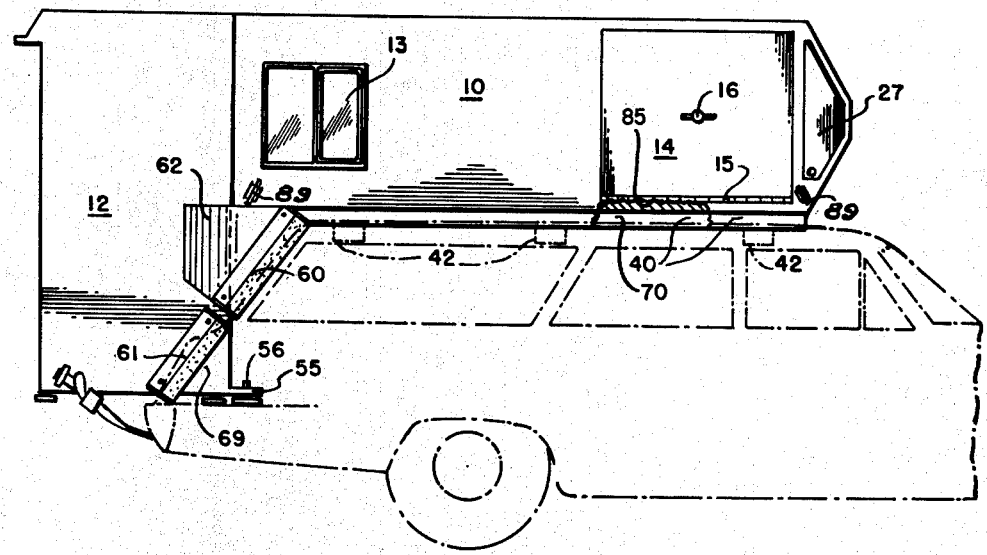
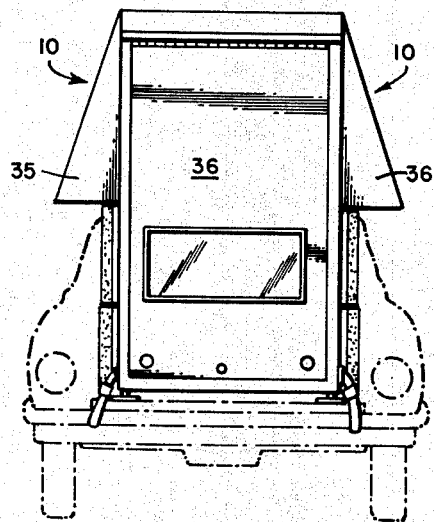
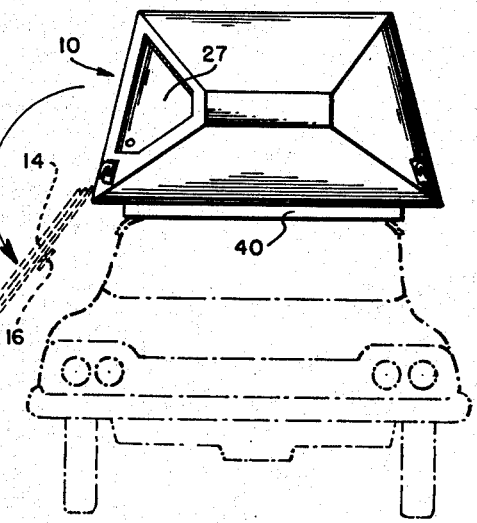
INVENTOR.
PAUL R. ZENTNER
BY
*Clarence M. Tuck*

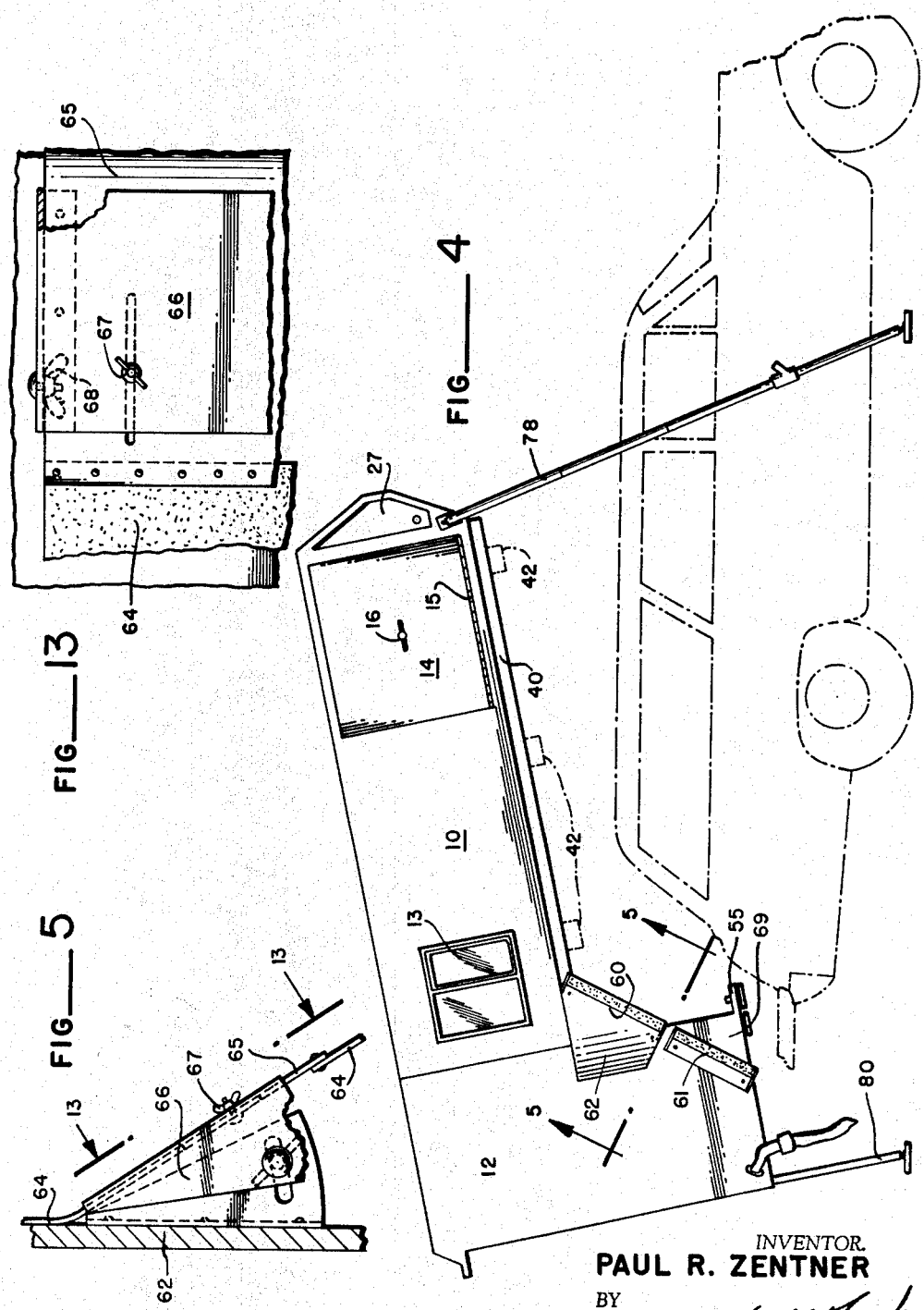

INVENTOR.
PAUL R. ZENTNER
BY
Clarence M. Tuck

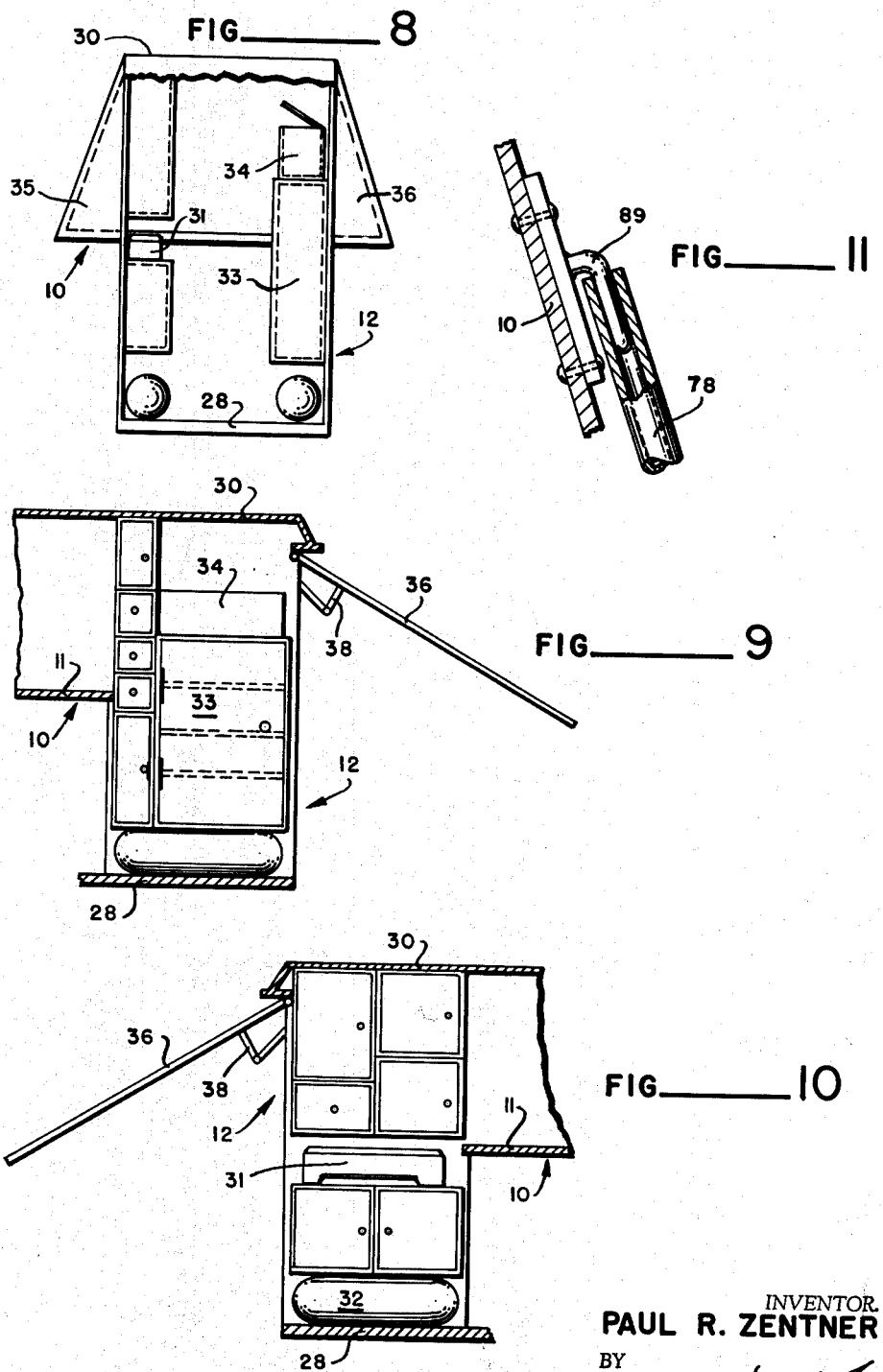

May 25, 1965 P. R. ZENTNER 3,185,518
AUTOMOTIVE CAMPING DEVICE FOR USE WITH STATION WAGONS
Filed Dec. 3, 1962 6 Sheets-Sheet 5

INVENTOR.
PAUL R. ZENTNER
BY
Clarence M. Fuch

May 25, 1965 P. R. ZENTNER 3,185,518
AUTOMOTIVE CAMPING DEVICE FOR USE WITH STATION WAGONS
Filed Dec. 3, 1962 6 Sheets-Sheet 6
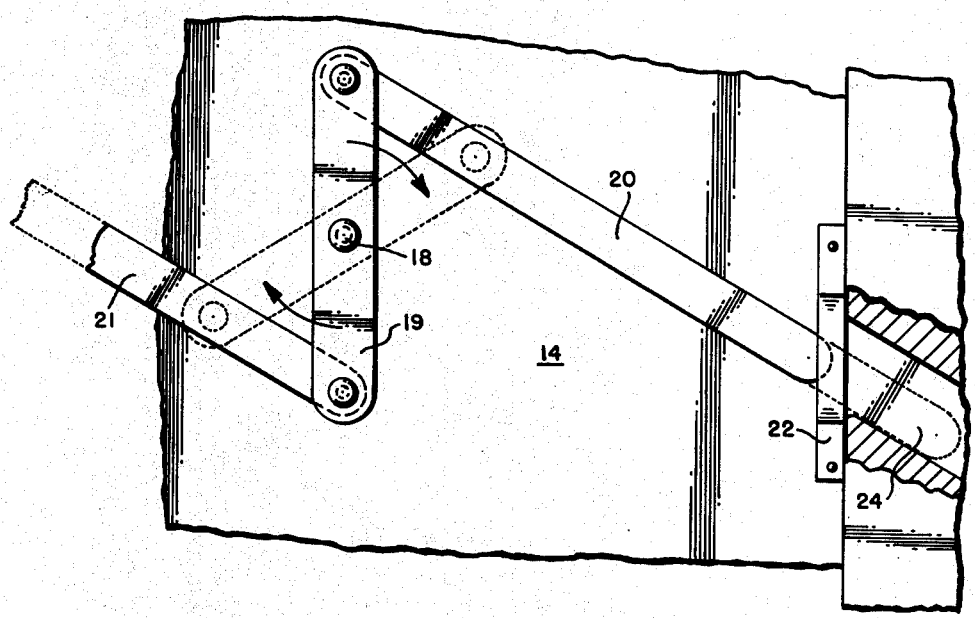
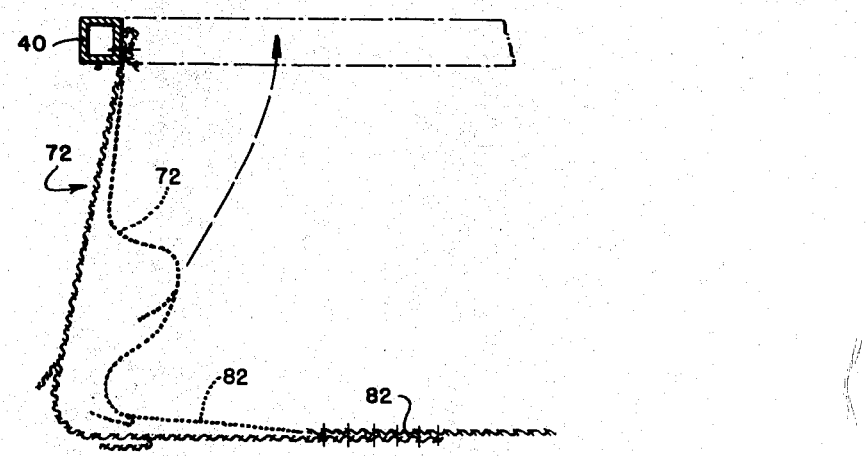
INVENTOR.
PAUL R. ZENTNER
BY
Clarence M. Tuck United States Patent Office 3,185,518
Patented May 25, 1965

3,185,518
AUTOMOTIVE CAMPING DEVICE FOR USE WITH STATION WAGONS
Paul R. Zentner, 107 NE. 43rd St., Seattle 5, Wash.
Filed Dec. 3, 1962, Ser. No. 241,753
9 Claims. (Cl. 296—23)

This present invention relates to the general art of traveling or portable camping devices and more especially to a camping device for use in association with the station wagon type of automotive vehicle.

In recent years there has been a gradual change in the desires and needs of those who use their automobiles for camping. Persons who partook of the earliest automobile camping transported their camp equipment in the automobile or in an open top wheeled trailer drawn behind it. Such equipment, usually included a tent for housing, cots, bedding, cooking facilities of some type such as a gasoline stove and a portable refrigerator and these items probably constituted the minimum of equipment needed. The next step in sequence was the house trailer in which, according to its size, weight and cost, one could enjoy a wide range of equipment and conveniences. The trailer did have the desirable feature that it could be left in a park or camp and the touring vehicle could be used for general purposes.

The next form of camp equipment endeavored to make use of the general facilities of the house trailer but to have these facilities more compactly arranged and this form, which is quite generally known as a camper, was built to fit on the rear deck or body portion of a light truck, normally referred to as a pick-up truck. In order to provide reasonable facilities within the short length of the pick-up body, this camper normally had a portion overhanging the cab of the truck. The high clearance required to accommodate this portion constituted a handicap when bringing the equipment off the highway into a wooded camping ground. On the other hand, this form of equipment was very compact and provided in one unit all the normal sanitary and cooking facilities, a permanent bed and usually a dinette that could additionally be converted into sleeping accommodations.

This present invention contemplates, as its general object, combining the good features of certain of these arrangements and adding other features not observed in any of this equipment. In the rear portion of my station wagon camper, storage is provided for all the fixed requirements. It provides separated storage for food which will be readily available so that a reasonable amount may be purchased at one time. A refrigerator is provided which in turn will also provide a supply of ice. A portable stove is provided which can be used in a fixed location on the camper or which can be easily removed to a point which might prove to be more convenient. Finally, in the lower portion of the fixed facility there is a suitable source of fuel for the stove and possibly for use in a gas refrigerator. The various drawers, bins and compartments constiuting the rear of the fixed portion of the device is provided preferably with a full length door covering the entire cabinet. Further, the top is hinged under an overhanging roof portion so as to provide a practical shelter in inclement weather.

A rigid enclosure joins the upper forward side of the storage compartment, extends out to the normal witdh of the car body and along the top of the car resting upon a plurality of brackets which position pads designed to place the weight of this member on the curved margins of the station wagon body which are internally constructed in the car body to accept reasonable weight. This compartment provides a full sized facility for sleeping for at least two people and a very adequate storage facility when the unit is on the road. The camper is further provided with a minimum of four jacks so arranged that the entire weight of the camper can be accepted by the jacks so that the camper may be raised sufficiently above the car to permit it to be driven away for any desired use leaving the camper leveled at a height sufficient to give limited head room underneath the longitudinal overhanging portion. A suitable protective covering of tent-like structure may then be used to enclose the area underneath the camper and with the car removed, a very considerable protected space is thus provided.

In the drawings:

FIGURE 1 is a side elevation of a camper made after the teachings of this present invention and showing the same as applied to a station wagon, the same being shown in side elevation and in dashed lines.

FIGURE 2 is a rear end elevation, illustrating the cross-section of the forward extending portion and again showing the station wagon body in dashed outline.

FIGURE 3 is a view similar to that of FIGURE 2 but showing the front of the camper with the station wagon again shown in dashed lines.

FIGURE 4 is a side elevation of the camper as it is being raised off the transporting station wagon so that the same may be driven away for conventional use.

FIGURE 5 is a fragmentary cross-sectional view, on an increased scale, taken along the line 5—5 of FIGURE 4 and showing a means to seal the space between the margins of the station wagon and the camper proper.

FIGURE 8 is a rear view of the rear portion or storage compartment of the camper from which the rear door has been removed.

FIGURE 9 is an elevation, in longitudinal section through the rear of the camper, taken from the left side of the storage compartment.

FIGURE 10 is an elevation, in longitudinal section through the camper, taken from the right side of the storage compartment.

FIGURE 11 is a fragmentary view, on an increased scale, showing the means employed for securing the upper end of the tubular jack member to rigid hook members secured to the camper body.

FIGURE 13 is a sectional view, in elevation, and on an increased scale, illustrating along with FIGURE 5, the sealing means and padding between the camper and the station wagon body.

FIGURE 16 is a fragmentary view on an increased scale partly in section showing a suitable locking means for the front side door of the camper.

FIGURE 17 is a partial transverse vertical section through one side bottom frame of the camper and showing the disposition of the tent fabric and floor fabric.

Figure 6:
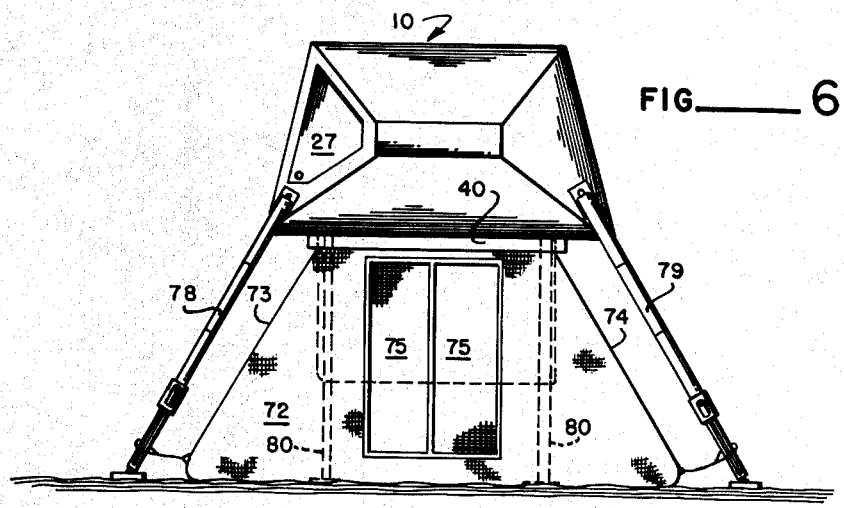
FIGURE 6 shows a front elevation of the camper with the automobile removed and shows the tent structure in position.

Referring to the drawings, throughout which like reference characters indicate like parts, the numeral 10 designates the shallow forward portion of my camper. this member is proportioned so as to overlay and be easily carried on the top or roof of the ordinary station wagon. At the rear of the horizontal portion 10 I employ a vertical storage and kitchen portion 12 which has a common roof with the shallow horizontal portion 10 but extends downwardly to the level of the tail gate when the same is lowered, although it does not rest on the tail gate. The horizontal portion of my camper is provided with oppositely disposed windows 13 so that the rear end of the horizontal portion, which is normally used for sleeping, may have adequate cross ventilation. Forward of the sleeping end of portion 10 is a storage compartment which need not necessarily be separated from the sleeping compartment and which has a closing outside door 14 arranged to swing downwardly from the hinge 15. Locking levers are provided to secure the door in its upper position for traveling and this locking means is illustrated in part in FIGURE 16. Externally, a hand control handle 16 is provided which is fixed to and turns shaft 18, which shaft carries the actuating bar 19 and the two locking levers 20 and 21 which are pivoted thereto. These bars operate through a guide 22 and in their locked position assume the dotted line position shown at 24 in FIGURE 16. This door is further shown in its open position in FIGURE 3.

The extreme forward end of the horizontal portion of my camper is roughly pointed after the showing of FIGURES 1, 3, 4, 6 and 7, as at normal speeds this blunt pointing greatly reduces air resistance. This portion 26 is provided with its own door 27 and is normally used for the storage of the supporting legs of the camper, tent pins and equipment of such order.

The rear portion 12 of the camper is illustrated best in FIGURES 8, 9 and 10 where it will be noted that there is sufficient height between the ceiling and the floor 28 to give full standing room and this may be employed for cooking and other purposes during inclement weather or during short stops as for lunch and the like. FIGURE 8 illustrates that the transverse width of the portion 12 is equal to the width of the roof 30 of the horizontal portion so that it makes a symmetrical, neat appearance on the road. It will be noted that portion 10 has sidewalls which slope outwardly providing the additional triangular extensions 35 and thus increases the usable space of this portion. This provides a maximum width without overhanging the sides of the automobile. The desire to have cupboards and the like on each side of a central passageway makes it preferable to have the side walls of portion 12 vertical and these are divided as illustrated further in FIGURES 9 and 10, where it will be seen that there is ample room for a stove 31, a water tank 32, a refrigerator 33, ice storage 34 and then a relatively large number of smaller cupboards. These segregate the various items of food and the like so that they are available at mealtimes and it will always be convenient to take inventory. Because of the fact that relatively small quantities are all that can be carried there will be need for frequent replenishing. The back door 36 which gives access to portion 12 is shown in its open position where it is supported by a suitable bracket 38.

In constructing a camper of this order, especially for use on top of a relatively lightly built body of the station wagon type, it is very desirable that the weight be kept to a minimum and this calls for careful planning of the portion designated by the numeral 10 that lies on top of the automobile body. A preferred structure is that of a lower frame 40 having two sides and two transverse members rigidly secured together and preferably formed of lightweight square or rectangular tubing. Using frame 40 as a base, vertical and transverse members are provided, together with a light perimeter framing for the roof or top 30 and this is in turn covered by lightweight sheet materials or some of the treated fabrics. It is necessary to provide a substantial floor 11, preferably supported by the top of frame 40, as two or more persons are expected to sleep and move around in portion 10. The weight of the camper is distributed through a plurality of brackets 42 which rest upon the relatively strong portion of the rim of the station wagon top where it is bent over and of necessity considerably reinforced for its primary use.

Figure 12:
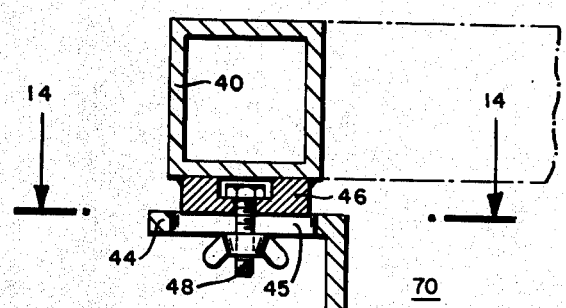
FIGURE 12 is a vertical, transverse section on an increased scale through one lower edge of the camper body showing the supporting pad and bracket and also the clamp securing means engaging the drip moulding of the automobile body, the body being shown in dot and dash lines.
Figure 14:
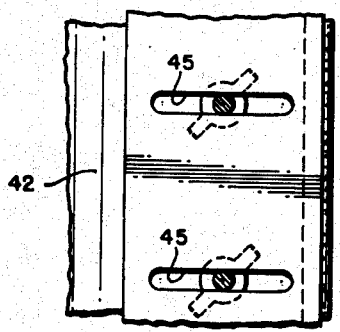
FIGURE 14 is a fragmentary view, in section, taken along the line 14—14 of FIGURE 12.

One preferred way of transferring the weight of the forward portion of the camper is by means of a plurality of pads 43 and brackets 42, shown best in FIGURE 12, together with the locking means therefor. Pads 42 engage the curved brackets 43 which are of irregular shape, as illustrated in FIGURE 12, providing a plurality of upper rest portions 44 having the transverse slots 45. The brackets are held to bases 46, which are preferably welded to frame 40, so that bolts 48 can adjustably position and secure the camper, by slots 45 and suitable nuts, to brackets 43 and the brackets in turn rest in the gutter 50 of the station wagon body and are held in that position by the clamp members 51 and the associated hooks 52 and 53.

Referring to FIGURE 1, the rear end of the camper has a forward extension of portions 12 indicated at 55 which is secured to the rear structural member of the station wagon body by suitable bolts 56. As it is very desirable to avoid placing any of the weight of the camper on the tail gate even though it is normally lowered when the camper is in place, it is important to make a direct weight transfer to the body frame of the station wagon by substantial means. This transfer is desirable with most station wagons because the tail gate supporting hinges and brackets are inadequate to accept any appreciable additional weight or to absorb the road shocks of weight imposed upon them when they are in the open position.

As station wagons vary from year to year in all makes of car and the different makes vary considerably from each other, it has been found desirable to employ a sealing means as shown in FIGURES 1, 2, 4, 5 and 13 at 60 and 61. Sheet sealing means 64 are preferably employed and are adjustably positioned as by the metal members 65 and 66 which employ slots, bolts and wing nuts such as are shown at 67 and 68. The upper portion of the sealing means has the upper adapter bracket 62 which will vary with different automobiles and is a special part made to adapt the camper to the different cars to insure the seal between the camper and the station wagon so there will be no draughts or openings for dust and the like to pass through. The lower sealing member 61 is similar and follows the same general principle of a lower adapter bracket 69 and adjustable means for positioning the sheet sealing material as 64. One form of adjustability is illustrated further in FIGURES 5 and 13 in which the sealing material is shown at 64, the positioning bracket member 66 and the adjustably positioned metal support 65 to which the sealing sheet 64 is riveted or otherwise secured.

Figure 7:
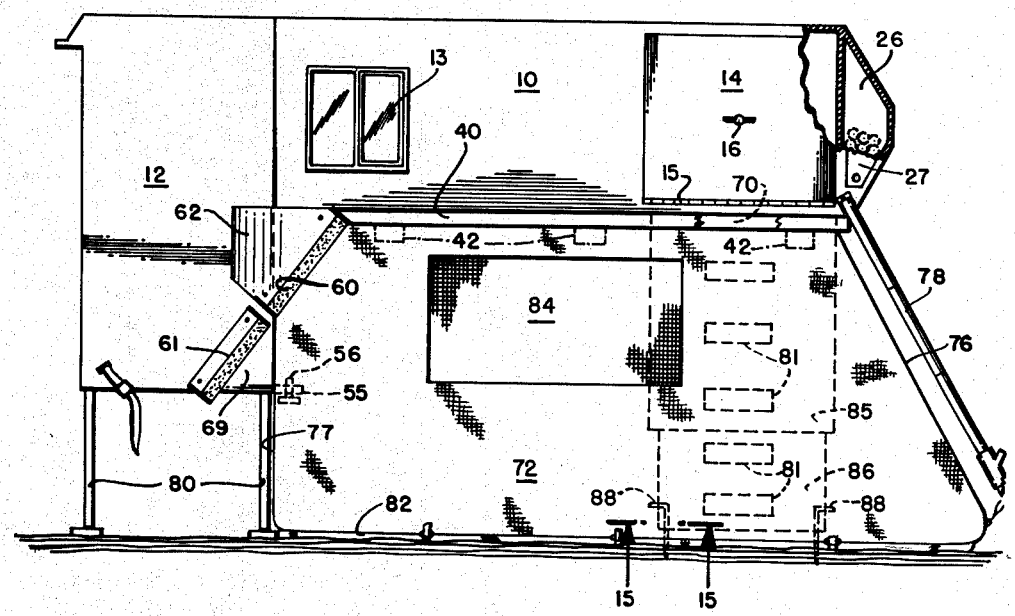
FIGURE 7 is a side elevation of the camper and the tent shown in FIGURE 6.

When the camper is on the road there is a space 70 under the floor 11 of portion 10 as shown in FIGURES 1 and 12. This contains a fabric tent 72 marginally secured to the floor 11 which is of an extent approximately as shown in FIGURES 6 and 7. This tent has slanting walls 73 and 74, doors 75 and end portion 76 which is also slanting and end portion 77 which follows the front wall of portion 12 of the camper and is substantially vertical as illustrated.

It is very desirable to have means whereby the station wagon may be released for normal use while the camper is left in place, and to achieve this a plurality of jacks are employed. In the front, and in the rear when conditions require, adjustable jacks are provided at 78 and 79. These jacks are angularly disposed transversely and longitudinally of the camper. At the rear the camper is preferably provided with shorter vertical legs also equipped with jacks illustrated at 80 in FIGURES 6 and 7. These long front jacks provide a great deal of stability for the whole assembly. They also provide guy means for the bottom of the tent 72 which is held out snugly so its fabric floor 82 will be reasonably taut at all times. The manner in which the camper is raised so that the station wagon can be driven away is best illustrated in FIGURE 4.

Figure 15:
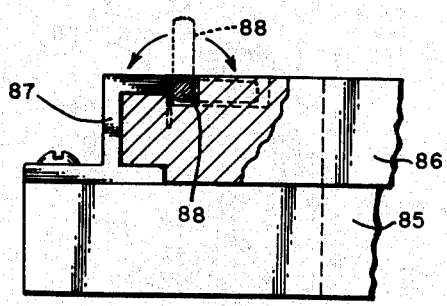
FIGURE 15 is a fragmentary horizontal sectional view taken along the line 15—15 of FIGURE 7.

In FIGURE 7 is shown a large piece of sheet material 85, preferably plywood, which, in its horizontal position, is used as a trap door. A narrower piece 86 of similar material serves as a latch for door 85 and, as shown in FIGURE 15, is held in sliding relationship with this door by the metal angle guides 87, one on each side. Sheet 86 is slid outwardly past the edge of sheet 85 so that it rests on frame 40. The opposite edge of sheet 85 is hingedly secured to the opposite side of frame 40.

These two sheets 85 and 86 also form a ladder for access to the interior of portion 10 of the camper by the use of a plurality of through openings 81, as shown in dotted lines in FIGURE 7. These provide foot holds in the ladder formed by sheets 85 and 86. Drive pins 88 slidably secured in sheet 86 serves to fixedly position the ladder assembly while the camper is parked in use. These pins also are shown in FIGURES 7 and 15.

It is believed that it will be clearly apparent from the above description and the disclosure in the drawings that the invention comprehends a novel construction of an automotive camping device for use with station wagons.

Having thus described my invention, I claim:

1. A camping device for use with station wagon type of automobiles, comprising: a relatively shallow forward portion to overlay the roof of a station wagon; a rear vertical storage and kitchen portion having a common roof line with said forward portion and extending downwardly substantially to the opened tail gate of a station wagon; said forward and rear portions each having access doors and windows; a rectangular, rigid, lower frame providing a base for supporting and positioning said forward portion of said camping device; a plurality of pads to engage an automobile body and brackets conforming to said body and adjustably connected to said lower frame; said rear portion of said camping device having a central passageway and partitioned storage units on each side of said passageway; a rear door for said rear portion; means for supporting said rear portion from the structural members of said station wagon; means for sealing the juncture of the rear of the station wagon body and the side walls of said rear portion and extensible jack means for lifting said camping device off a station wagon, leveling said device and supporting it during use.

2. A camping device for use with station wagon type of automobiles, comprising: a relatively shallow forward portion to overlay the roof of a station wagon; a rear vertical storage and kitchen portion extending downwardly substantially to the opened tailgate of a station wagon; said forward and rear portions each having access doors and windows; a rectangular, rigid, lower frame providing a base for supporting and positioning said forward portion of said camping device; a plurality of pads to engage an automobile body and brackets conforming to said body and adjustably connected to said lower frame; said rear portion of said camping device having a central passageway and partitioned storage units on each side of said passageway; means for supporting said rear portion from the structural members of said station wagon; means for sealing the juncture of the rear of the station wagon body and the side walls of said rear portion and extensible jack means for lifting said camping device off a station wagon, leveling said device and supporting it during camping use.

3. A camping device for use with station wagon type of automobiles, comprising: a relatively shallow forward portion to overlay the roof of a station wagon; a rear vertical storage and kitchen portion extending downwardly to just clear the opened tailgate of a station wagon; said forward and rear portions each having access doors and windows; a rectangular, rigid, lower frame providing a base for supporting and positioning said forward portion of said camping device; a plurality of pads to engage an automobile body and brackets conforming to said body and adjustably connected to said lower frame; a substantial floor for said forward portion supported by the upper surface of said frame; said rear portion of said camping device having a central passageway and partitioned storage units on each side of said passageway; a rear door for said rear portion; a substantial forwardly extending means for supporting and securing said rear portion from a structural member of said station wagon; means for sealing the juncture of the rear of the station wagon body and the side walls of said rear portion and extensible jack means for lifting said camping device off a station wagon, leveling said device and supporting it during periods when it is removed from a station wagon.

4. In combination with the subject matter of claim 3, a space is provided between the top of said lower frame and the top of an automobile body carrying said camping device; a foldable tent having its top peripherally secured to the said floor inside said frame and carried in said space.

5. In combination with the subject matter of claim 3, a trap door of substantial form hingedly secured at one end to a floor frame member of said forward portion and having slide means for engaging frame member opposite from the said hingedly secured end; cutout foot holds in said trap door and drive pin means on said slide means for stabilizing said door against swinging under load.

6. In combination with the subject matter of claim 3, wherein said forward portion has a floor of substantially greater width than the roof of said portion and inwardly and upwardly sloping side walls connecting said floor and said roof.

7. An automotive camping device for use with station wagons, comprising: a rigid L-shaped body having a vertical portion of substantial height to be positioned above the open tail gate of a station wagon and a shallow horizontal portion to be positioned on top of the station wagon body; marginal pads to support said body from the body of the station wagon; a plurality of storage compartments on each side of said vertical portion and a passageway between them; a plurality of adjustable and yieldable sealing means disposed to seal the juncture between said body and the station wagon body; telescoping jacks secured, one substantially at each corner of said body and outwardly sloping longitudinally and transversely; said horizontal portion of said body having an isosceles trapezoidal, transverse cross-section and a length sufficient for a sleeping compartment and a storage compartment; access means to said compartments and closure means for said access means; and a tent secured to the bottom of said horizontal portion and having sides substantially parallel to said jacks, a forward end substantially parallel to the forward pair of jacks and a rear end conforming to the under form of said body.

8. An automotive camping device for use with station wagons, comprising: an L-shaped body having a vertical portion of substantial height to be positioned above the open tail gate of a station wagon and a shallow horizontal portion to be positioned on top of the station wagon body; marginal pads to support said body from the body of the station wagon; a plurality of storage compartments on each side of said vertical portion; adjustable and yieldable sealing means disposed to seal the juncture between said body and the station wagon body; telescoping jacks secured, one at each forward corner of said body and outwardly sloping longitudinally and transversely; said horizontal portion of said body having an isosceles trapezoidal, transverse cross-section and a length sufficient for a sleeping compartment and a storage compartment; access means to said compartments and closure means for said access means; and a tent secured to the bottom of said horizontal portion and having sides substantially parallel to said jacks, a forward end substantially parallel to the forward pair of jacks and a rear end conforming to the under form of said L-shaped body.

9. An automotive camping device for use with station wagons, comprising: a rigid L-shaped body having a vertical portion of walk-in height to be positioned above the open tail gate of a station wagon and a shallow horizontal portion to be positioned on top of the station wagon body; marginal pads to support said body from the body of the station wagon; a plurality of storage compartments on each side of said vertical portion; a plurality of adjustable and yieldable sealing means disposed to seal the juncture between said body and the station wagon body; telescoping jacks secured, one substantially at each corner of said body and outwardly sloping longitudinally and transversely; said horizontal portion of said body having an isosceles trapezoidal, transverse cross-section and a length sufficient for a sleeping compartment and a storage compartment and access means to said compartments and closure means for said access means.

References Cited by the Examiner

UNITED STATES PATENTS

| | | | |
|---|---|---|---|
| 1,984,681 | 12/34 | Jackson | 135—4 |
| 2,245,465 | 6/41 | Cole | 296—23 X |
| 2,614,882 | 10/52 | Cook | 296—23 |
| 2,662,232 | 12/53 | Daly | 296—23 X |
| 2,788,238 | 4/57 | Baird | 296—23 X |
| 2,930,051 | 3/60 | Kampmeier | 224—42.1 |
| 2,984,515 | 4/61 | Hocks | 296—23 |
| 3,006,519 | 10/61 | Doane | 224—42.1 |
| 3,074,576 | 1/63 | Peterson | 214—515 |

MILTON BUCHLER, *Primary Examiner.*

A. HARRY LEVY, *Examiner.*